US 8,739,821 B2

(12) United States Patent
Murabayashi et al.

(10) Patent No.: US 8,739,821 B2
(45) Date of Patent: Jun. 3, 2014

(54) FUEL TANK

(75) Inventors: Shinya Murabayashi, Utsunomiya (JP); Kengo Kobayashi, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 134 days.

(21) Appl. No.: 13/383,451

(22) PCT Filed: Jun. 25, 2010

(86) PCT No.: PCT/JP2010/060800
§ 371 (c)(1),
(2), (4) Date: Jan. 11, 2012

(87) PCT Pub. No.: WO2011/007654
PCT Pub. Date: Jan. 20, 2011

(65) Prior Publication Data
US 2012/0118401 A1   May 17, 2012

(30) Foreign Application Priority Data

Jul. 16, 2009  (JP) ................. 2009-167467

(51) Int. Cl.
*F02M 37/02*  (2006.01)
(52) U.S. Cl.
USPC ...... 137/565.22; 137/448; 137/265; 137/143; 123/509; 123/514
(58) Field of Classification Search
USPC ......... 137/131, 135, 137, 142, 147, 265, 571, 137/574, 527.4, 417, 448, 422, 630.19, 143, 137/565.22, 565.34; 123/509, 510, 514
See application file for complete search history.

(56) References Cited

U.S. PATENT DOCUMENTS

| 2,646,061 | A | * | 7/1953  | Bottum ................... 137/142 |
| 5,170,764 | A | * | 12/1992 | Tuckey ................... 123/509 |
| 5,363,827 | A | * | 11/1994 | Siekmann ................ 123/509 |
| 5,724,947 | A | * | 3/1998  | Takaki et al. ............ 123/509 |
| 5,979,485 | A |   | 11/1999 | Tuckey et al. |
| 6,505,644 | B2 | * | 1/2003 | Coha et al. .............. 123/514 |

(Continued)

FOREIGN PATENT DOCUMENTS

DE   43 37 183 A1   5/1995
DE   199 00 378 A1   7/2000

(Continued)

OTHER PUBLICATIONS

US Office Action issued Dec. 24, 2013 in co-pending U.S. Appl. No. 13/147,223.

*Primary Examiner* — John Rivell
*Assistant Examiner* — Craig J Price
(74) *Attorney, Agent, or Firm* — Carrier Blackman & Associates, P.C.; William D. Blackman; Fulchand P. Shende

(57) ABSTRACT

A fuel introduction member is connected to an open end of a siphon tube which constitutes a part of a fuel tank. The fuel introduction member is provided with an opening through which a fuel is introduced from the tank into the siphon tube and from the siphon into the tank, a lid portion which is swung by the hydraulic pressure from the siphon tube so as to open the opening, and a float member which floats on the fuel in accordance with the rise of a fuel liquid surface in the tank to displace the lid portion in order to open the opening.

12 Claims, 11 Drawing Sheets

(56) References Cited

U.S. PATENT DOCUMENTS

| | | |
|---|---|---|
| 6,607,005 B2 | 8/2003 | Viebahn et al. |
| 6,863,084 B2 | 3/2005 | Aschoff |
| 6,871,640 B2 * | 3/2005 | Atwood et al. ............... 123/509 |
| 6,955,158 B2 * | 10/2005 | Rumpf .......................... 123/514 |
| 7,069,913 B1 | 7/2006 | Crary |
| 7,284,540 B2 | 10/2007 | Attwood et al. |
| 7,730,877 B2 | 6/2010 | Suda et al. |
| 2003/0127134 A1 | 7/2003 | Mills |
| 2004/0182454 A1 | 9/2004 | Atwood et al. |
| 2011/0290793 A1 * | 12/2011 | Murabayashi et al. ....... 137/143 |

FOREIGN PATENT DOCUMENTS

| | | |
|---|---|---|
| DE | 10 2006 059 967 A1 | 6/2008 |
| JP | 63-104671 | 7/1988 |
| JP | 64-028318 U | 2/1989 |
| JP | 10-061515 A | 3/1998 |
| JP | 2007-051633 A | 3/2007 |

* cited by examiner

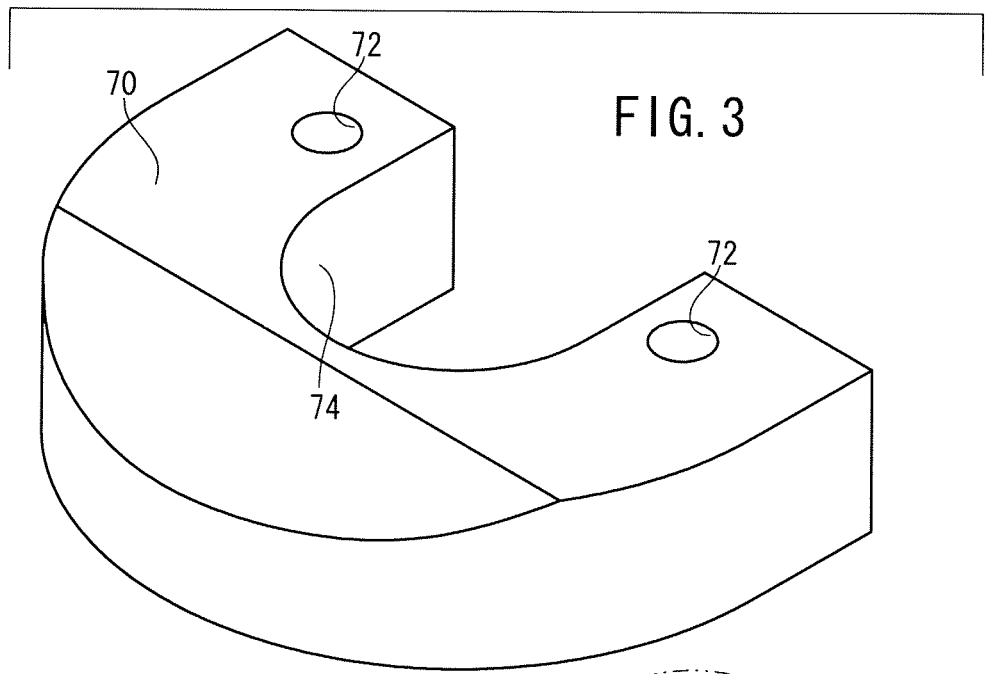
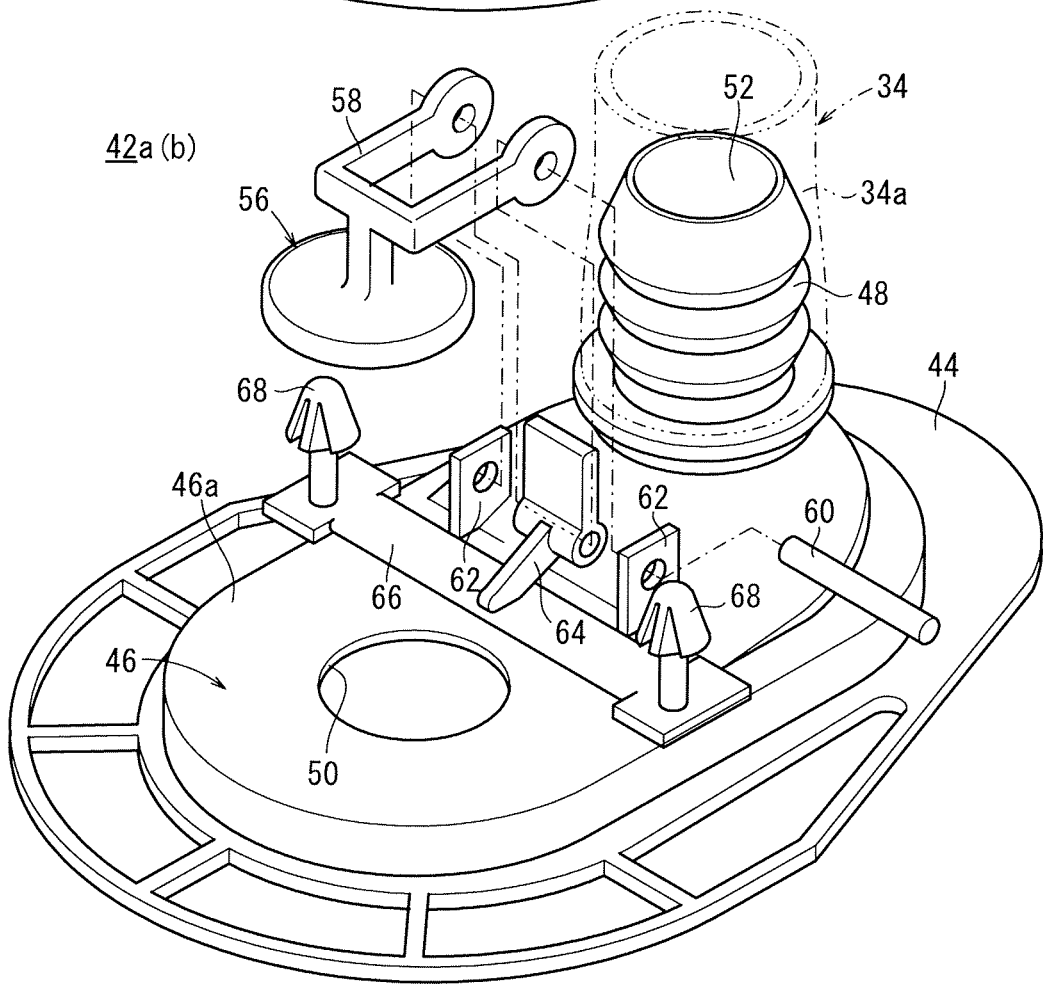
FIG. 3

FUEL TANK

TECHNICAL FIELD

The present invention relates to a fuel tank including a first reservoir and a second reservoir for reserving fuel, a siphon tube that extends between the first reservoir and the second reservoir, and which transfers the fuel by a negative pressure generator, and a fuel introducing member connected to at least one open end of the siphon tube.

BACKGROUND ART

Fuel tanks are used to supply fuel to internal combustion engines. For example, 4WD (four-wheel-drive) vehicles and FR (front engine, rear wheel drive) vehicles use a so-called saddle type fuel tank, the bottom of which is upwardly recessed at a center portion in the width direction of the vehicle in order for the fuel tank to avoid physical interference with a propeller shaft, which extends down the middle of the vehicle.

A saddle fuel tank generally is divided into a first reservoir for reserving fuel and a second reservoir for reserving fuel. Each of the first reservoir and the second reservoir is equipped respectively with a fuel pumping system. Accordingly, in comparison with fuel tanks for use in 2WD (two-wheel-drive) vehicles, a saddle fuel tank requires two fuel pumping systems, and a problem is encountered in that a saddle fuel tank tends to be more costly and larger in size.

Thus, for example, there is known a fuel tank level equalizer system, as disclosed in Japanese Laid-Open Patent Publication No. 10-061515. As shown in FIG. 11 of the accompanying drawings, the fuel tank level equalizer system includes a fuel tank 1 having two separate sections 1a, 1b, and operates to maintain equal fuel levels in the separate sections 1a, 1b via a siphon 2.

The separate section 1b houses therein a fuel pump module 3, which has an outlet connected to a bypass pressure regulator 4. The regulator 4 has an outlet connected to a conduit 5 through which liquid fuel is supplied to a nozzle 6a of a jet pump 6. The jet pump 6 is operated by liquid fuel that is supplied to the nozzle 6a, thereby transferring the fuel through the interior of the siphon 2 from respective fuel pickups 2a, 2b of the siphon 2.

Accordingly, the fuel levels in the separate sections 1a, 1b are equalized through the siphon 2, whereby a single fuel level sensor 7 can monitor all of the fuel levels in the vehicle.

In the above fuel tank 1, each of the fuel pickups 2a, 2b is equipped with a flow valve assembly, not shown, which is actuated by a filter and a diaphragm. The filter is made of a flexible material having small openings or pores therein. The filter, when wetted, prevents air from flowing therethrough due to a capillary action of the liquid fuel. In the event that liquid fuel is not present in the inlets of the fuel pickups, air is prevented from flowing therethrough by a liquid capillary seal of the filter.

SUMMARY OF INVENTION

However, the above fuel tank 1 is made up of a large number of components and is complex in structure, because the fuel tank 1 includes actuating parts such as the filter having small openings therein, the diaphragm, and the like, as well as the flow valve assembly. For this reason, problems result in that the fuel tank is costly to manufacture and is low in productivity and endurance reliability. Furthermore, the fuel undergoes a large pressure loss due to the fact that the fuel flows through the filter having small openings therein, thereby resulting in a reduced siphon transfer speed. Accordingly, the filter tends to become clogged with dirt and may also suffer from damage.

Additionally, since the filter of the aforementioned fuel tank 1 has a liquid filter structure, the filter fails to provide a sealing function when the filter is dry or is not in a wetted state. Therefore, the filter cannot prevent air from flowing therethrough, and a problem results in that the filter does not provide a stable siphoning effect. For example, if fuel is present only in the separate section 1a, then no siphon effect is provided and the fuel levels in the separate sections 1a, 1b cannot be equalized.

The present invention has been made in an effort to solve the above problems. An object of the present invention is to provide a fuel tank having a simple and economical structure, which is capable of obtaining a desired siphon effect and using the fuel in the fuel tank efficiently.

The present invention concerns a fuel tank including a first reservoir and a second reservoir for storing fuel, a siphon tube, which extends between the first reservoir and the second reservoir, and which transfers the fuel by means of a negative pressure generator, and a fuel introducing member connected to at least one open end of the siphon tube.

In the fuel tank, the fuel introducing member comprises an opening for introducing the fuel into the siphon tube from the interior of the tank as well as for introducing the fuel into the interior of the tank from the siphon tube, a lid which, in a gaseous atmosphere, is displaced by liquid pressure from the siphon tube so as to be capable of opening the opening, and a float member which, by rising of the liquid level of the fuel in the tank, floats on the fuel and then causes the lid to be displaced to thereby open the opening.

According to the present invention, when a gaseous layer (gaseous atmosphere) exists in the tank interior and a liquid layer (liquid atmosphere) is produced in the siphon tube, the lid is displaced by the liquid pressure from the siphon tube thereby to open the opening. Owing thereto, without any influence being imparted due to the size (and weight) of the float member, the opening can reliably be opened in a gaseous atmosphere, and fuel can suitably be introduced into the tank interior from the siphon tube.

In addition, the float member floats on the fuel and then causes the lid to be displaced due to the liquid level of the fuel rising within the tank, thereby enabling the opening to be opened. Consequently, even if an abrupt rise of the liquid level of the fuel occurs as a result of supplying fuel or the like, due to the buoyancy of the float member, the lid is displaced and the opening can reliably be opened. Thus, introduction of fuel into the siphon tube from the interior of the tank can smoothly be carried out.

BRIEF DESCRIPTION OF DRAWINGS

FIG. 3 is an exploded perspective view of the fuel introducing member;

DESCRIPTION OF EMBODIMENTS

Figure 1:
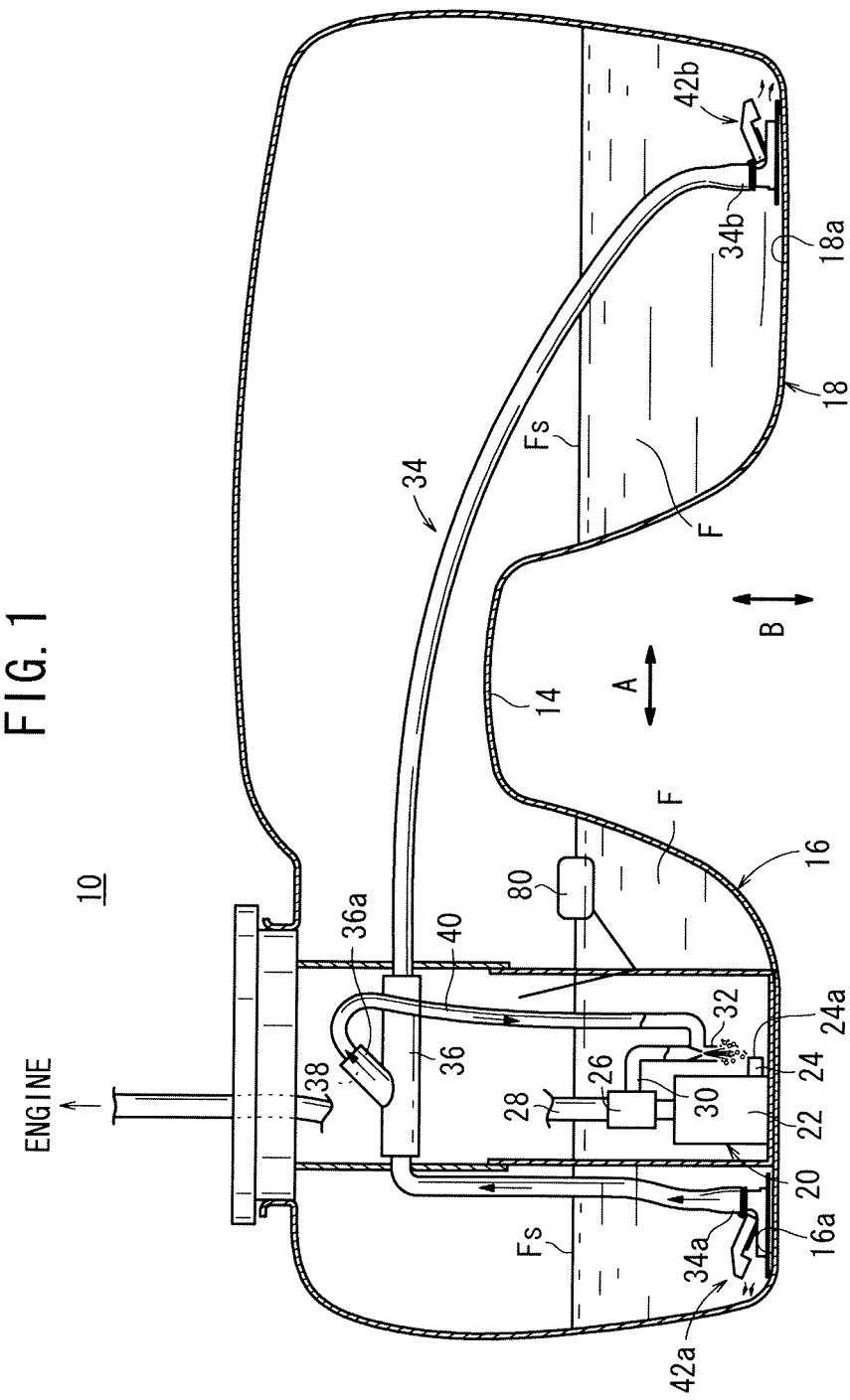
FIG. 1 is a schematic structural view of a fuel tank according to a first embodiment of the present invention.

As shown in FIG. 1, a fuel tank 10 according to a first embodiment of the present invention comprises a saddle type fuel tank, which is mounted on a vehicle, not shown. The fuel tank 10 includes an upwardly curved saddle 14 on a bottom substantially central portion thereof in the width direction (indicated by the arrow A) of the vehicle. The saddle 14 forms a main tank (first reservoir) 16 and a sub-tank (second reservoir) 18 in the fuel tank 10.

A fuel pump module 20 is disposed in the main tank 16. The fuel pump module 20 comprises a fuel pump 22, including a pumping jet pump 24 that has a fuel intake port 24a, which opens toward the bottom of an inner surface 16a of the main tank 16, and also including a pressure regulator 26 connected to an outlet side of the fuel pump 22.

The pressure regulator 26 supplies fuel F to a non-illustrated engine through a fuel pipe 28, and has a suction branch pipe 30 extending therefrom. The branch pipe 30 has a distal end (lower end) connected to a suction jet pump 32, which acts as a negative pressure generator.

The fuel tank 10 houses therein a siphon tube 34 extending over the bottoms of inner surfaces 16a, 18a of each of the main tank 16 and the sub-tank 18. The siphon tube 34 includes a three-way joint 36 at an upper portion thereof, which includes a suction connector 36a having a check valve 38 disposed therein. The suction connector 36a is connected to one end of a suction tube 40, while the other end of the suction tube 40 is connected to a suction side (negative pressure side) of the suction jet pump 32.

Figure 2:
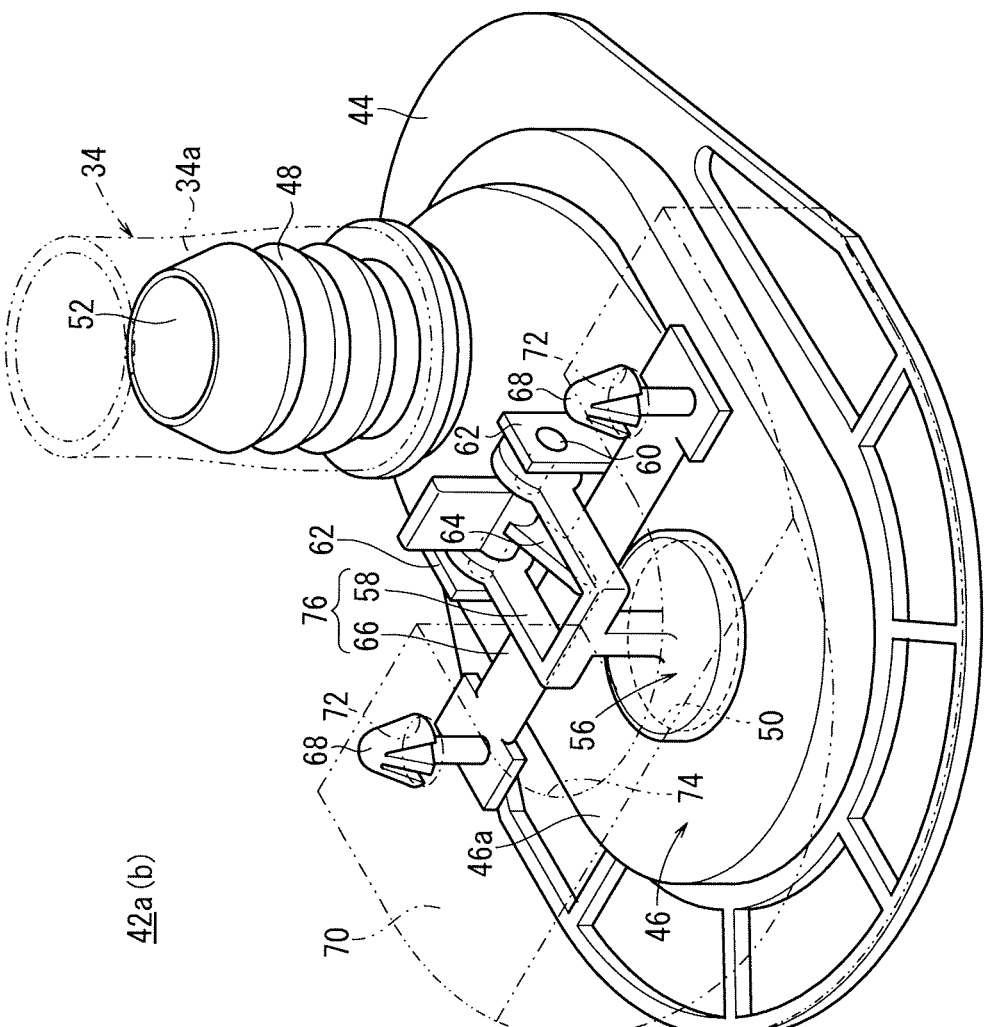
FIG. 2 is an outline perspective view of a fuel introducing member that makes up part of the fuel tank.
Figure 4:
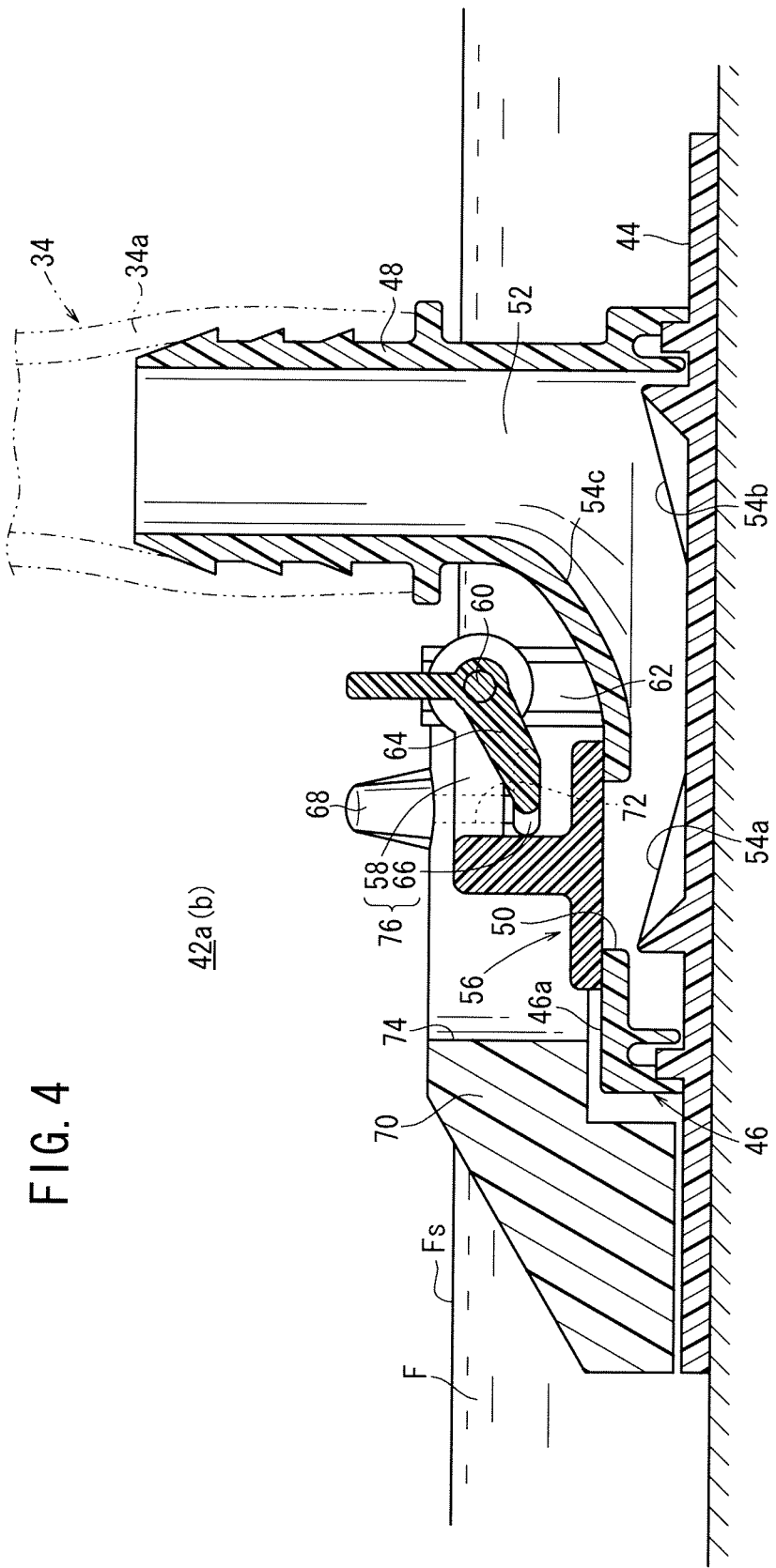
FIG. 4 is a sectional side view of the fuel introducing member.

A fuel introducing member 42a is connected to the open end 34a of the siphon tube 34 on the main tank 16 side thereof. As shown in FIGS. 2 through 4, the fuel introducing member 42a comprises a base 46, which is disposed on a supporting plate 44, and a joint member 48, which is formed integrally on one end of the base 46 and extends therefrom in a vertically upward direction. The open end 34a of the siphon tube 34 is connected to the joint member 48.

A circular opening 50 is formed on an upper surface 46a of the base 46. The opening 50 serves to introduce fuel F from the interior of the fuel tank 10 (main tank 16) into the siphon tube 34, as well as from the siphon tube 34 into the interior of the fuel tank 10 (main tank 16).

An L-shaped passage 52 is formed inside the fuel introducing member 42a. Tapered guide surfaces 54a, 54b and 54c for smoothly guiding the fuel F are provided on the inner wall surface constituting the passage 52, between the opening 50 and the open end 34a of the siphon tube 34.

The opening 50 is opened and closed by a lid 56. The lid 56 is capable of being displaced by liquid pressure from the siphon tube 34, under conditions of a gaseous atmosphere inside the main tank 16, to thereby open the opening 50. The lid 56 includes a pair of arms 58. Ends of the pair of arms 58 are swingably supported through a support shaft 60 by a pair of support members 62 formed on the upper surface 46a of the base 46.

A swinging member 64 is supported on the support shaft 60 and is positioned between the pair of arms 58. An arm 66, which is positioned downwardly from the arms 58 and extends in a direction intersecting with the arms 58, is formed integrally with the swinging member 64. Inserts 68, which bulge upwardly, are formed on opposite ends of the arm 66. The inserts 68 are inserted into holes 72 of a float member 70, whereby the float member 70 is attached to the swinging member 64.

The float member 70 is substantially U-shaped having a concavity 74 provided on a center side thereof. The lid 56 is positioned to be capable of swinging within the concavity 74. When the lid 56 is swung independently to open the opening 50, the concavity 74 constitutes an inlet for introducing the fuel F into the main tank 16 from the opening 50. The float member 70 possesses buoyancy that is greater than that of the lid 56, and the float member 70 floats on the fuel upon rising of the liquid level Fs inside the fuel tank 10, and is swung upwardly about the support shaft 60.

An engagement mechanism 76 is constituted by the arm 66 of the swinging member 64 and the arms 58 of the lid 56. The engagement mechanism 76 functions to open the opening 50 by causing the arm 66 to abut against the arms 58, and by causing the lid 56 to swing upwardly integrally with the float member 70 when the float member 70 swings.

As shown in FIG. 1, a fuel introducing member 42b is connected to an open end 34b of the siphon tube 34 on the side of the sub-tank 18. The fuel introducing member 42b is identical in structure to the aforementioned fuel introducing member 42a. Those parts of the fuel introducing member 42b which are identical to those of the fuel introducing member 42a are denoted by identical reference characters, and detailed explanations of such features are omitted (see FIGS. 2 through 4). Further, only one of the fuel introducing members 42a, 42b may be used.

The fuel pump module 20 includes a float 80 for detecting the position of the liquid level Fs of the fuel F stored in the main tank 16.

Operations of the fuel tank 10, which is constructed in the foregoing manner, shall be explained below.

When the fuel pump 22 of the fuel pump module 20 is actuated, the fuel F stored in the main tank 16 is transferred (drawn in) from the fuel intake port 24a under operation of the pumping jet pump 24.

The fuel F is supplied from the pressure regulator 26 through the fuel pipe 28 to the engine, and also is supplied through the branch pipe 30 to the suction jet pump 32, thereby developing a negative pressure in the suction tube 40. Since the suction tube 40 is connected to the siphon tube 34 through the three-way joint 36, the interior of the siphon tube 34 is evacuated.

Figure 5:
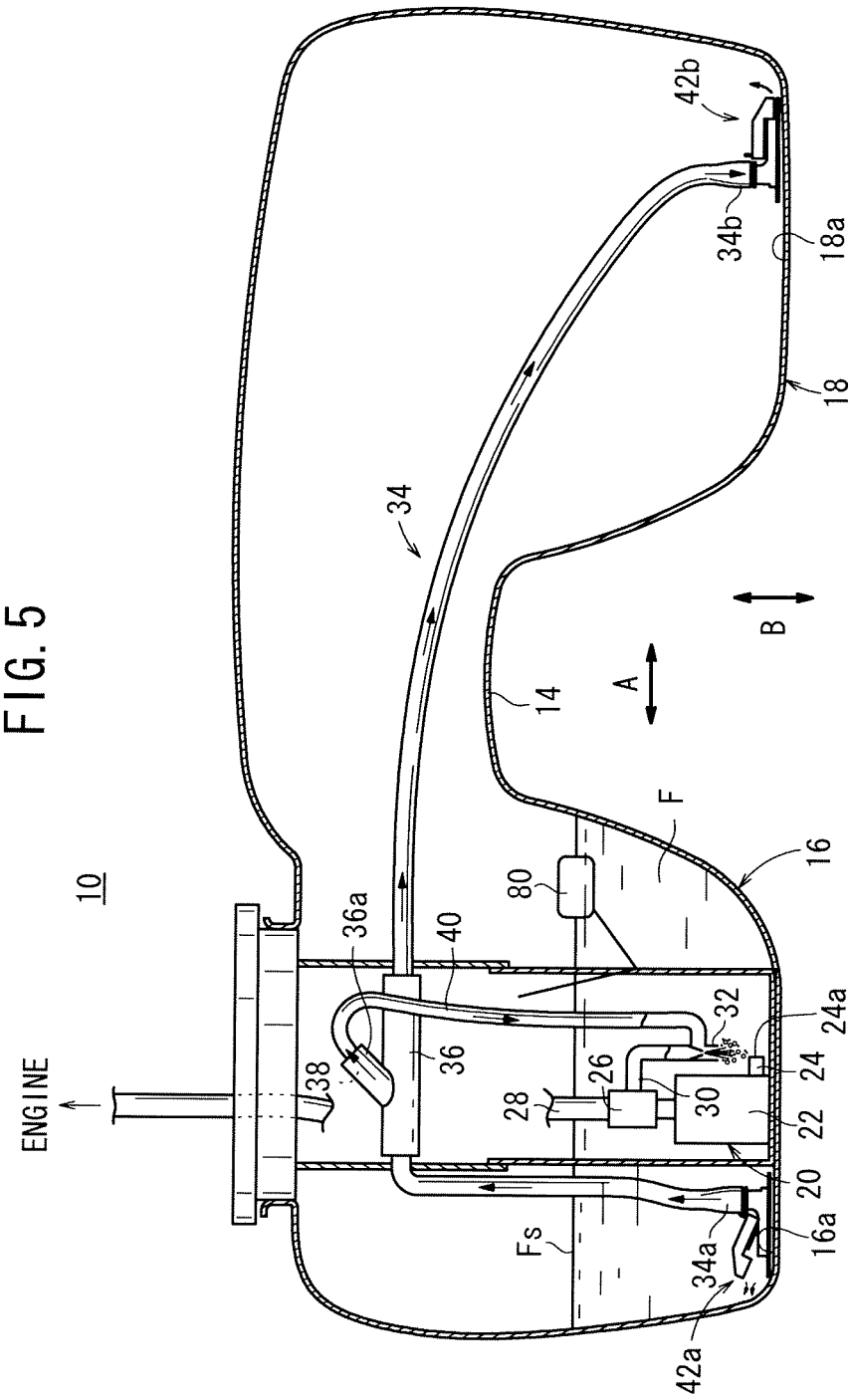
FIG. 5 is a view illustrative of operations of the fuel tank.

For example, one open end 34a of the siphon tube 34 is placed in the fuel F stored in the main tank 16, whereas the other open end 34b thereof is placed in the sub-tank 18, which initially is free of fuel F, with the lid 56 being closed (see FIG. 5).

Consequently, when the interior of the siphon tube 34 is evacuated by the suction jet pump 32, fuel F that has been drawn from one open end 34a of the siphon tube 34 through the opening 50 of the fuel introducing member 42a and the passage 52 is transferred to the other open end 34b of the siphon tube 34.

At the open end 34b, the fuel introducing member 42b is connected, and a gaseous layer (gaseous atmosphere) is formed in the interior of the sub-tank 18 in which the fuel introducing member 42b is arranged. Owing thereto, the float member 70, which possesses large buoyancy, and more specifically, which is large in weight, is maintained in a closed position to thereby close the opening in opposition to the liquid pressure from the siphon tube 34.

On the other hand, compared to the float member 70, the lightweight lid 56 is swung vertically upward about the support shaft 60 individually (independently from the float member 70) by the liquid pressure from the siphon tube 34. Accordingly, the opening 50 is opened, and the fuel F on the side of the main tank 16 is delivered from the siphon tube 34 and via the opening 50 to the side of the sub-tank 18. As a result, the siphon tube 34 exhibits a siphoning function.

At this time, although the float member 70 is maintained in a closed position, in the float member 70, the concavity 74 is formed therein so as to avoid the lid 56 and the opening 50. Owing thereto, the fuel F can smoothly be introduced from the opening 50 and into the sub-tank 18 through the concavity 74. In the foregoing manner, through the siphoning function of the siphon tube 34, the respective liquid levels Fs of the fuel F inside the main tank 16 and the fuel F that is transferred into the sub-tank 18 are brought to the same height.

Incidentally, when supply of fuel is carried out inside the fuel tank 10, for example, if fuel F is supplied into the main tank 16 and a rapid rise of the liquid level Fs occurs, the float member 70 having large buoyancy floats on the fuel F due to rising of the liquid level Fs, and the float member 70 swings upwardly about the support shaft 60.

Figure 6:
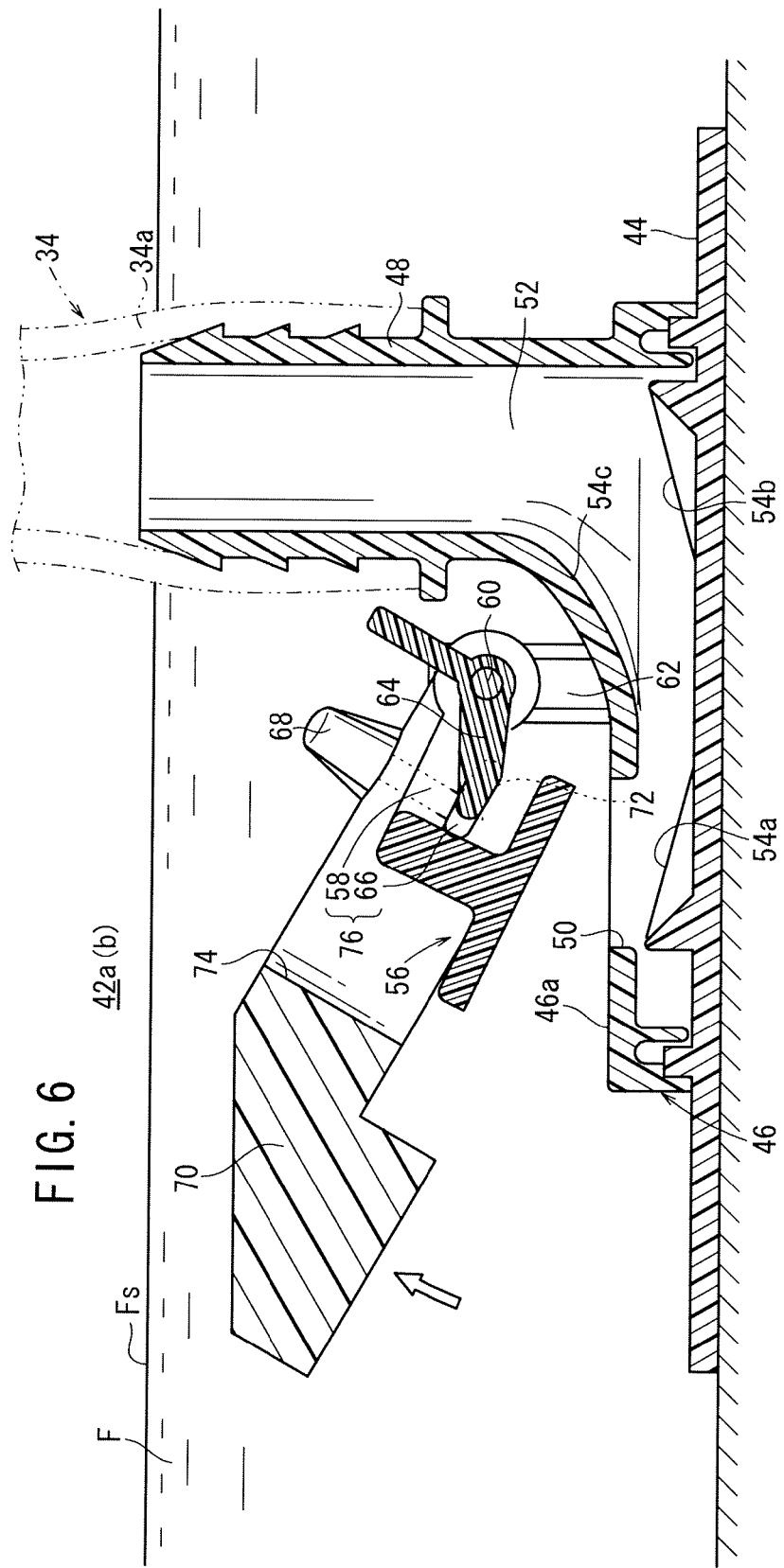
FIG. 6 is a view illustrative of operations of the fuel introducing member.

Accordingly, the arm 66 provided on the swinging member 64 abuts against the pair of arms 58 of the lid 56, and the arms 58 are swung upwardly. More specifically, the lid 56 is swingably displaced upwardly integrally with the float member 70 by the engagement mechanism 76 (see FIG. 6). As a result, the opening 50 is opened, so that fuel F can be introduced from the main tank 16 via the siphon tube 34 into the sub-tank 18.

In this case, according to the first embodiment, as shown in FIG. 5, when a gaseous layer (gaseous atmosphere) develops inside the sub-tank 18 and a liquid layer (liquid atmosphere) occurs in the siphon tube 34, the lid 56 is displaced independently by the liquid pressure from the siphon tube 34 and the opening 50 is opened. Owing thereto, the opening 50 can reliably be opened in a gaseous atmosphere without being influenced by the size (and weight) of the float member 70, and an effect can be obtained in that the fuel F can be introduced suitably into the sub-tank 18 from the siphon tube 34.

On the other hand, for example, when the float member 70 floats on the fuel F due to a rise in the liquid level Fs inside the main tank 16, the lid 56 is swingably displaced via the engagement mechanism 76, whereby the opening 50 is opened. Further, as discussed above, the float member 70 can be set to a large shape in order to obtain sufficient buoyancy, without the weight of the float member 70 itself exerting any influence on opening and closing of the lid 56.

Accordingly, even when large water pressure on the lid 56 is generated by an abrupt rise in the liquid level Fs by supply of fuel or the like, the lid can be made to swing due to the buoyancy of the float member 70, and the opening 50 can be opened reliably. Owing thereto, introduction of fuel into the siphon tube 34 from the interior of the main tank 16 can smoothly be carried out.

In addition, as shown in FIG. 4, the fuel introducing members 42a, 42b are provided on the inner wall surfaces constituting the passages 52, with tapered guide surfaces 54a to 54c for guiding the fuel F being provided between the opening 50 and the siphon tube 34. Therefore, the fuel F can smoothly and reliably flow along the bent passage 52, with the advantage that the operation to introduce fuel can be carried out more efficiently.

Additionally, the fuel introducing member 42a is arranged on the bottom of the main tank 16, so that fuel F stored in the main tank 16 can be siphoned suitably without an undue amount of fuel remaining in the main tank 16.

In particular, according to the first embodiment, the fuel introducing member 42a is arranged in the main tank 16, whereas the fuel introducing member 42b is arranged in the sub-tank 18. As a result, there is an advantage in that operations to siphon residual fuel F both from the main tank 16 and the sub-tank 18 can be carried out efficiently.

Figure 7:
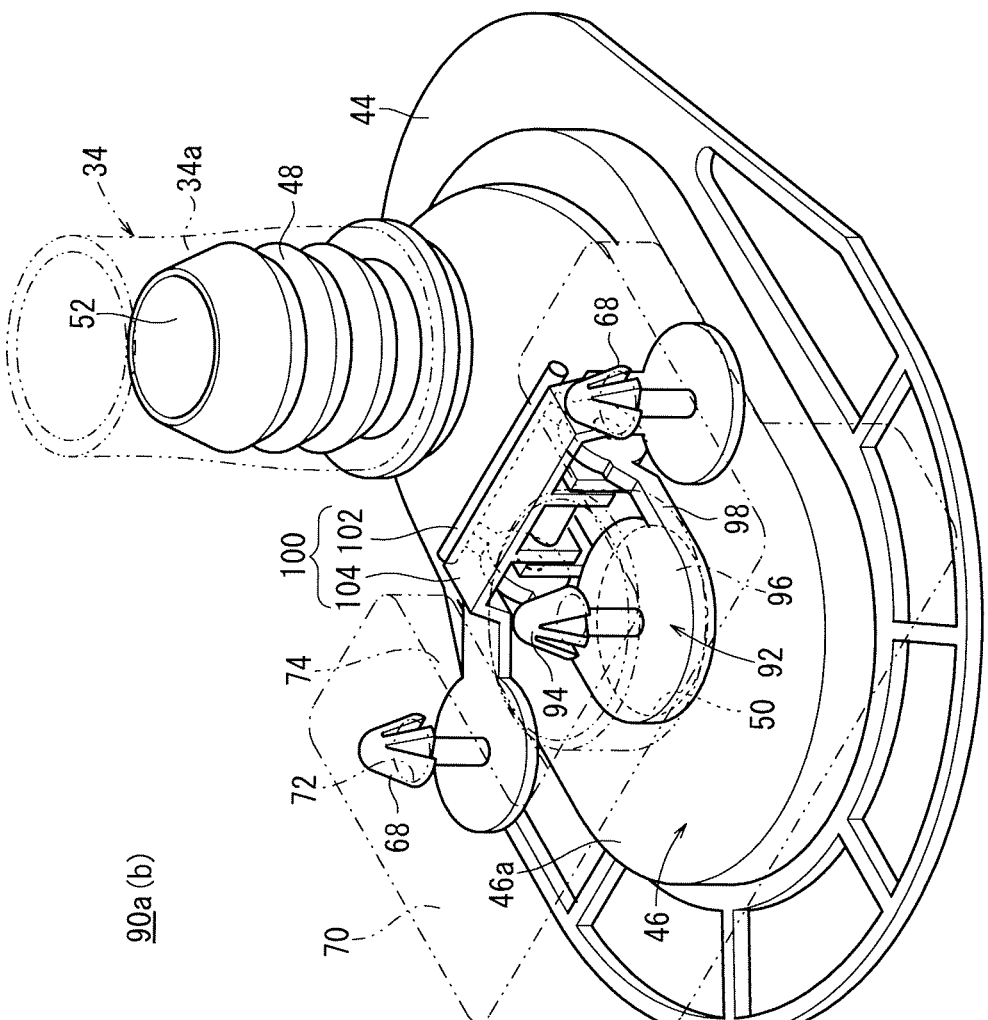
FIG. 7 is an outline perspective view of a fuel introducing member that makes up part of a fuel tank according to a second embodiment of the present invention.

FIG. 7 is an outline perspective view of fuel introducing members 90a, 90b that make up part of a fuel tank according to a second embodiment of the present invention.

Constituent elements of the second embodiment, which are the same as those of the fuel tank 10 according to the first embodiment, are denoted by identical reference characters and detailed explanations of such features are omitted. Similar constituent elements of the third embodiment, also to be described below, are treated in the same manner and detailed explanations thereof shall be omitted.

Figure 8:
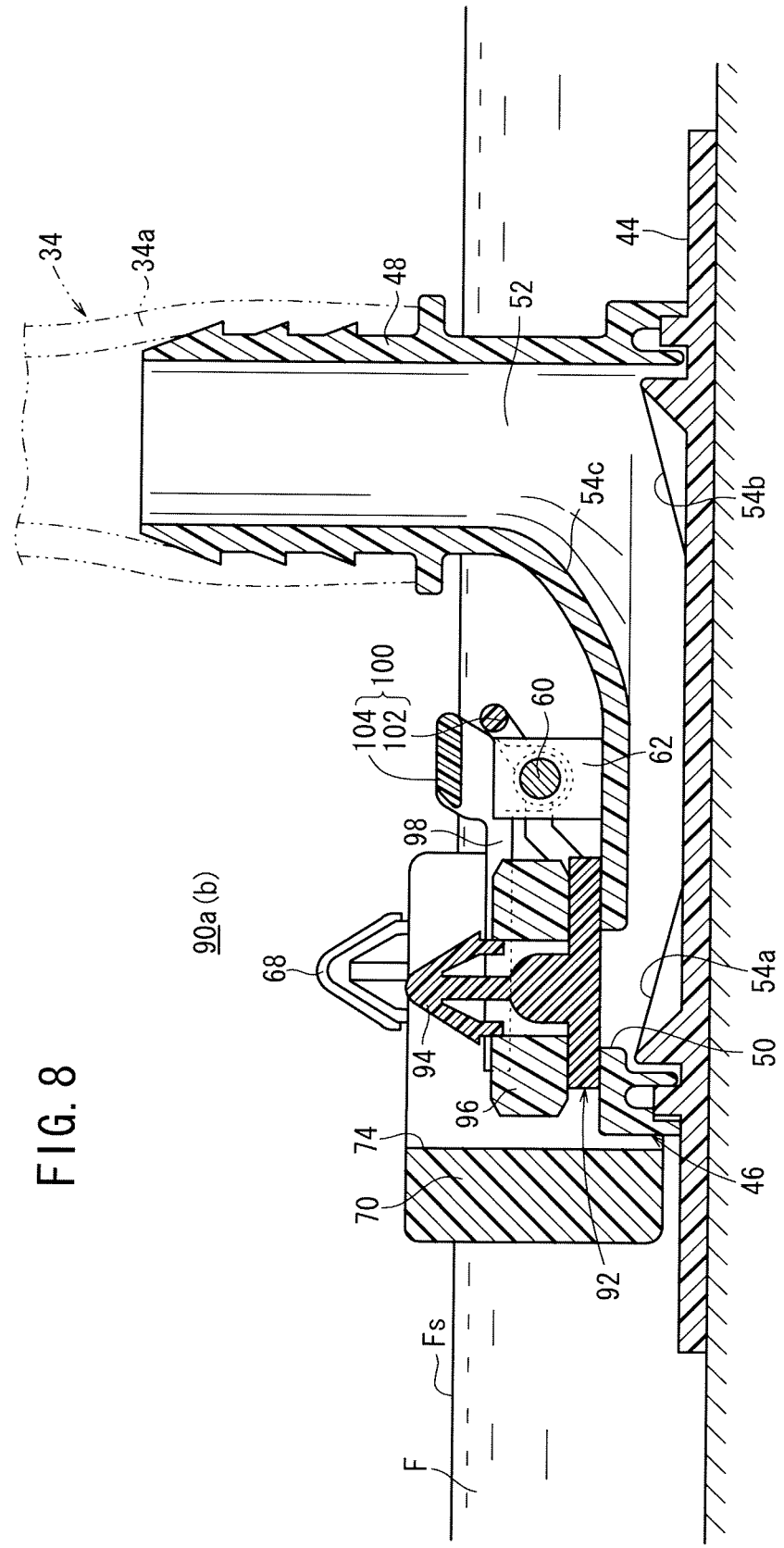
FIG. 8 is a sectional side view of the fuel introducing member.

As shown in FIGS. 7 and 8, the lid 92 of each of the fuel introducing members 90a, 90b has an insert 94 which is formed to bulge upwardly in a disk-shaped central region thereof, with an auxiliary float member 96 being mounted on the insert 94. The auxiliary float member 96 is formed to be lighter in weight than the float member 70, and in a gaseous atmosphere, the auxiliary float member 96 together with the lid 92 is swingable by liquid pressure from the siphon tube 34 to thereby open the opening 50, whereas the auxiliary float member 96 exhibits sufficient buoyancy with respect to water pressure (i.e., in a liquid atmosphere).

The float member 70 is mounted on a swingable member 98, and an engagement mechanism 100 is constructed on the swingable member 98 and the lid 92. The engagement mechanism 100 includes a rod 102, which is provided on the lid 92 parallel with the support shaft 60, and a presser 104, which is provided on the swingable member 98 and which engages with the rod 102 and then causes the lid 92 to swing when the swingable member 98 is swung through a predetermined angle.

The second embodiment, which is constructed in the foregoing manner, can obtain the same advantages and effects as those of the above first embodiment.

Figure 9:
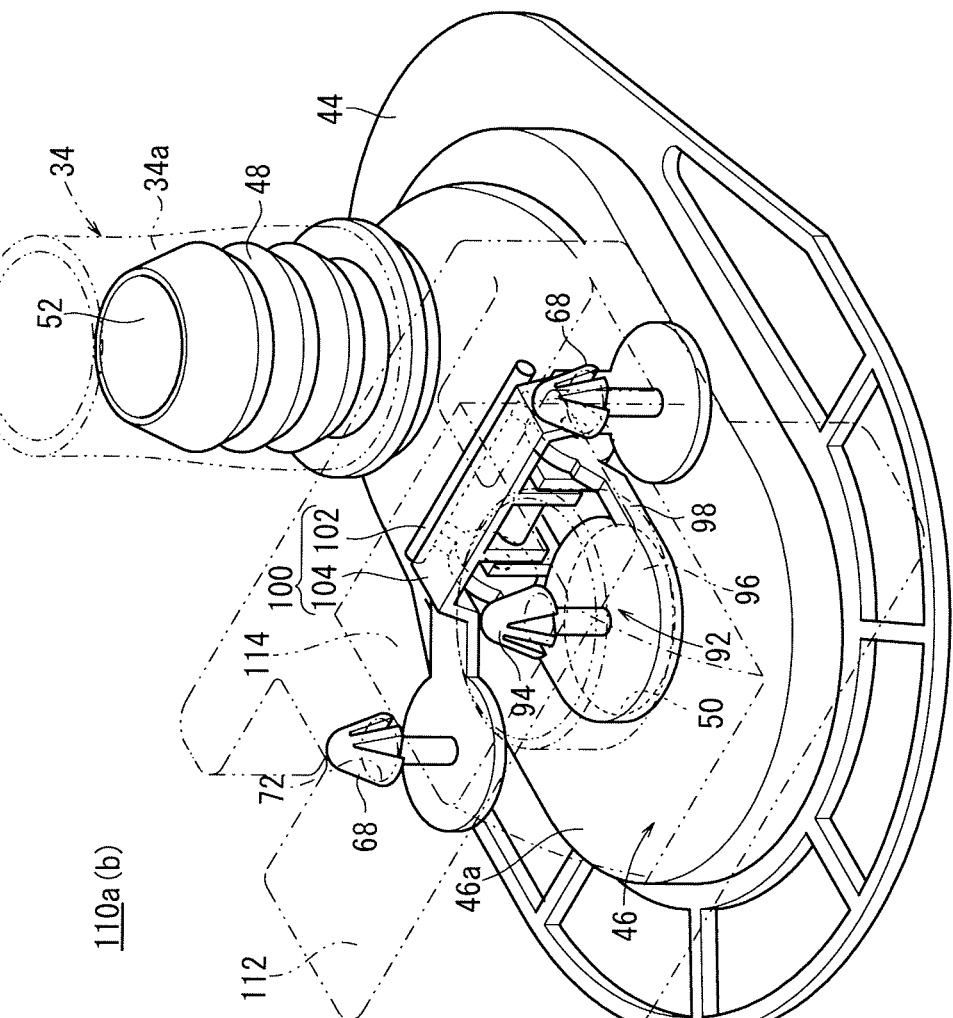
FIG. 9 is an outline perspective view of a fuel introducing member that makes up part of a fuel tank according to a third embodiment of the present invention.

FIG. 9 is an outline perspective view of fuel introducing members 110a, 110b that make up part of a fuel tank according to a third embodiment of the present invention.

Figure 10:
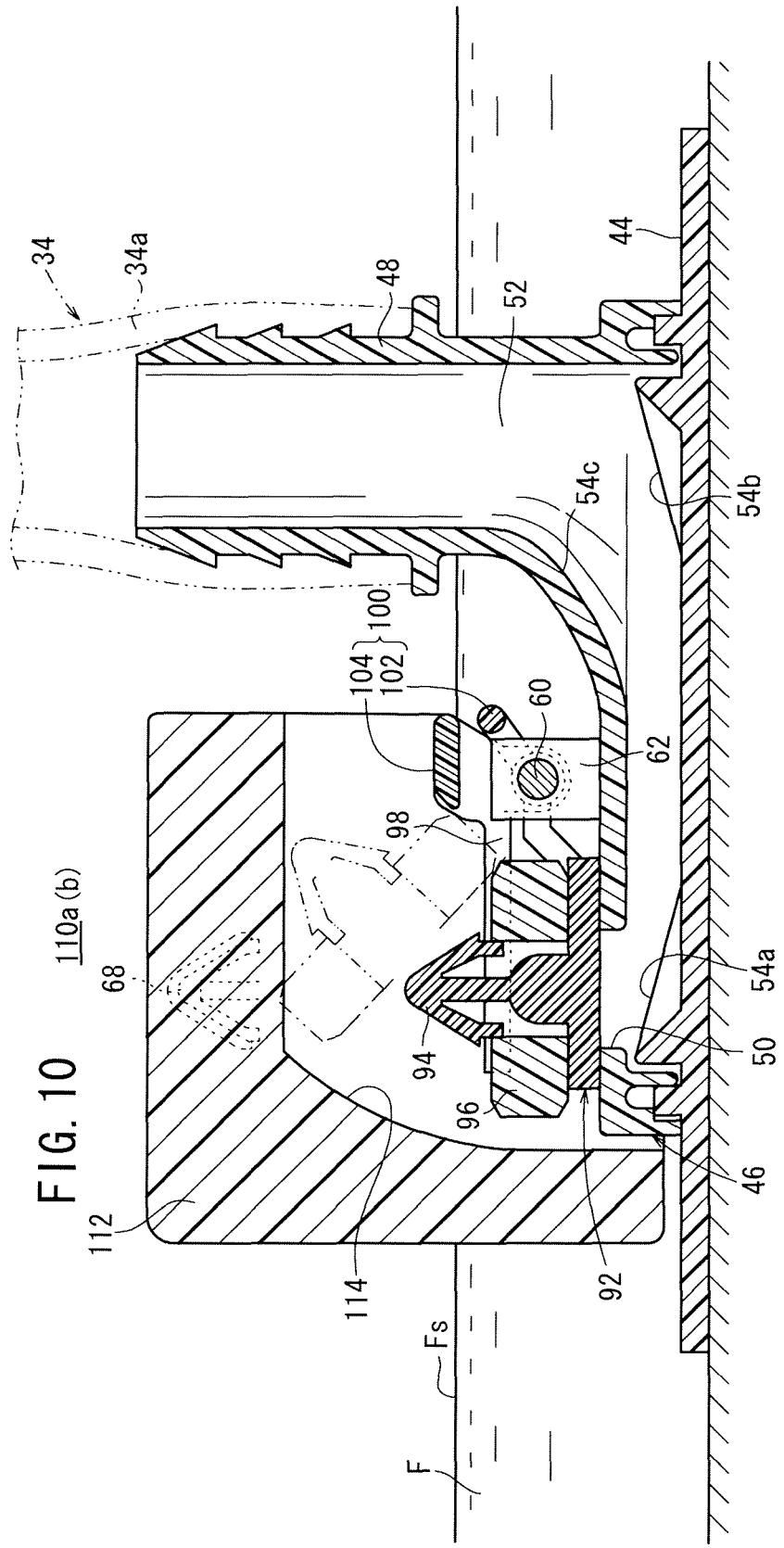
FIG. 10 is a sectional side view of the fuel introducing member.
Figure 11:
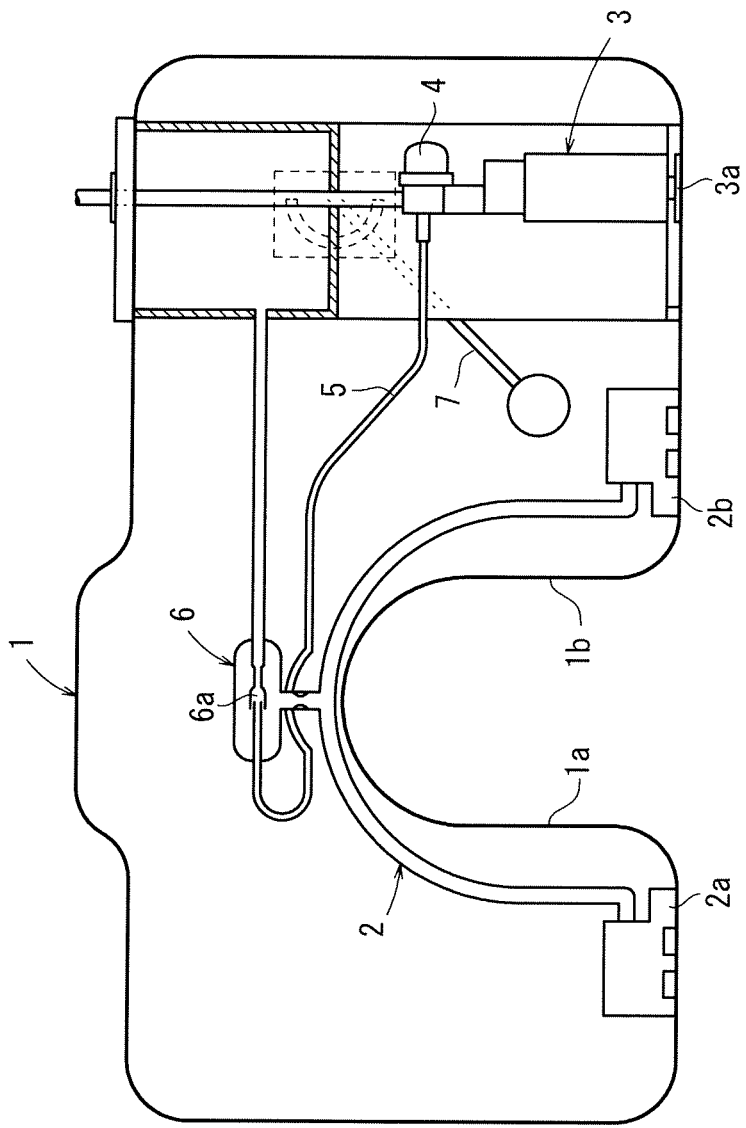
FIG. 11 is a view showing a fuel tank level equalizer system as disclosed in Japanese Laid-Open Patent Publication No. 10-061515.

As shown in FIGS. 9 and 10, a float member 112, which makes up part of each of the fuel introducing members 110a, 110b, has a dimension that is large in the height direction, and is formed with a concavity 114 in an interior portion thereof. The concavity 114 is set to a dimension that is capable of accommodating swingability of the lid 92 within a predetermined angular range.

The third embodiment, which is constructed in the foregoing manner, can obtain the same advantages and effects as those of the above first and second embodiments.

The invention claimed is:

1. A fuel tank comprising:
   a main tank for storing fuel and a sub-tank for storing the fuel;
   a negative pressure generator arranged in one of said main tank and said sub-tank;
   a siphon tube, which extends between the main tank and the sub-tank and is operatively connected with said negative pressure generator, and which transfers the fuel by said negative pressure generator; and a fuel introducing member connected to at least one open end of the siphon tube, wherein the fuel introducing member comprises:

a base member having an opening formed therein for introducing the fuel into the siphon tube from the interior of the main tank or the sub-tank as well as for introducing the fuel into the interior of the main tank or the sub-tank from the siphon tube;

a lid which is displaced by liquid pressure from the siphon tube so as to open the opening when a gaseous layer exists in an interior of respective one of said main tank and said sub-tank; and a float member, which, by rising of the liquid level of the fuel in the main tank or the sub-tank, floats on the fuel and then causes the lid to be displaced, to thereby open the opening; and wherein the float member floats on the fuel stored in one of the main tank and the sub-tank, whereby the fuel introduced from the opening is drawn in the siphon tube by the negative pressure generator and the fuel is transferred to the other of the main tank and the sub-tank.

2. The fuel tank according to claim 1, further comprising another fuel introduction member, wherein each of the fuel introducing members is respectively connected to one of the open ends of the siphon tube; and wherein when the fuel is introduced into the siphon tube from the fuel introducing member of one of the main tank and the sub-tank, the lid of the fuel introducing member of the other of the main tank and the sub-tank is opened.

3. The fuel tank according to claim 1, wherein the float member includes a concavity for introducing the fuel into the interior of the tank from the opening when the lid is displaced independently to open the opening.

4. The fuel tank according to claim 1, wherein the lid and the float member are swingable respectively and independently about a support shaft; and an engagement mechanism is provided for causing the lid to swing integrally with the float member when the float member is swung.

5. The fuel tank according to claim 1, wherein the lid is equipped with an auxiliary float member that is lighter in weight than the float member.

6. The fuel tank according to claim 1, wherein a tapered guide surface for guiding the fuel is disposed on an inner wall surface of the fuel introducing member between the opening and the siphon tube.

7. A fuel tank comprising:

a main tank for storing fuel and a sub-tank for storing the fuel;

a negative pressure generator arranged in one of said main tank and said sub-tank;

a siphon tube, which extends between the main tank and the sub-tank and is operatively connected to said negative pressure generator, and which transfers the fuel by said negative pressure generator; and a fuel introducing member connected to at least one open end of the siphon tube, wherein the fuel introducing member comprises:

a base member having an opening formed therein for introducing the fuel into the siphon tube from the interior of the main tank or the sub-tank as well as for introducing the fuel into the interior of the main tank or the sub-tank from the siphon tube;

a lid which is displaced by liquid pressure from the siphon tube so as to be capable of opening the opening; and a float member, which, by rising of the liquid level of the fuel in the main tank or the sub-tank, floats on the fuel and then causes the lid to be displaced, to thereby open the opening; and wherein the float member floats on the fuel stored in one of the main tank and the sub-tank, whereby the fuel introduced from the opening is drawn in the siphon tube by the negative pressure generator and the fuel is transferred to the other of the main tank and the sub-tank; and wherein the lid is displaced independently from the float member for thereby opening and closing the opening.

8. The fuel tank according to claim 7, further comprising another fuel introduction member, wherein each of the fuel introducing members is respectively connected to one of the open ends of the siphon tube; and wherein when the fuel is introduced into the siphon tube from the fuel introducing member of one of the main tank and the sub-tank, the lid of the fuel introducing member of the other of the main tank and the sub-tank is opened.

9. The fuel tank according to claim 7, wherein the float member includes a concavity for introducing the fuel into the interior of the tank from the opening when the lid is displaced independently to open the opening.

10. The fuel tank according to claim 7, wherein the lid and the float member are swingable respectively and independently about a support shaft; and an engagement mechanism is provided for causing the lid to swing integrally with the float member when the float member is swung.

11. The fuel tank according to claim 7, wherein the lid is equipped with an auxiliary float member that is lighter in weight than the float member.

12. The fuel tank according to claim 7, wherein a tapered guide surface for guiding the fuel is disposed on an inner wall surface of the fuel introducing member between the opening and the siphon tube.

* * * * *